United States Patent [19]
Paranjape et al.

[11] Patent Number: 5,485,476
[45] Date of Patent: Jan. 16, 1996

[54] METHOD AND SYSTEM FOR ERROR TOLERANT SYNCHRONIZATION CHARACTER DETECTION IN A DATA STORAGE SYSTEM

[75] Inventors: Sushama M. Paranjape; Fernando Quintana, both of Tucson, Ariz.

[73] Assignee: International Business Machines Corporation, Armonk, N.Y.

[21] Appl. No.: 77,176

[22] Filed: Jun. 14, 1993

[51] Int. Cl.⁶ .............................. G06F 11/00; H04L 12/00
[52] U.S. Cl. .......................... 371/47.1; 371/42; 360/72.2
[58] Field of Search ............................ 371/47.1, 42, 61; 375/114, 116

[56] References Cited

U.S. PATENT DOCUMENTS

| | | | |
|---|---|---|---|
| 3,587,043 | 6/1971 | Mengant | 371/47.1 |
| 4,093,940 | 6/1978 | Maniere | 340/146.1 E |
| 4,353,130 | 9/1980 | Carasso et al. | 375/114 |
| 4,524,445 | 6/1985 | Fuji | 371/47 |
| 4,622,600 | 11/1986 | Okamoto et al. | 360/32 |
| 4,672,613 | 6/1987 | Foxworthy et al. | 371/38 |
| 4,680,766 | 7/1987 | Wilkinson | 371/47 |
| 4,763,339 | 8/1988 | Sutphin et al. | 375/114 |
| 4,914,535 | 4/1990 | Weng | 360/72.2 |
| 4,975,916 | 12/1990 | Miracle et al. | 371/47.1 |
| 5,228,041 | 7/1993 | Yoshino et al. | 371/47.1 |
| 5,241,490 | 8/1993 | Poon | 364/715 |
| 5,243,471 | 9/1993 | Shinn | 360/48 |
| 5,268,798 | 12/1993 | Shinn | 360/48 |
| 5,295,163 | 3/1994 | Fehlauer et al. | 375/114 |

FOREIGN PATENT DOCUMENTS

| | | | |
|---|---|---|---|
| 0540351 | 5/1993 | European Pat. Off. | H03M 13/00 |
| 0599290 | 1/1994 | European Pat. Off. | H04L 7/04 |
| 63-313358 | 12/1988 | Japan | G11B 20/10 |
| 1312779 | 12/1989 | Japan | G11B 20/10 |
| 5151708 | 6/1993 | Japan | G11B 20/10 |
| 9306593 | 4/1993 | WIPO | G11B 5/09 |

*Primary Examiner*—Roy N. Envall, Jr.
*Assistant Examiner*—Emmanuel L. Moise
*Attorney, Agent, or Firm*—D. A. Shifrin; Andrew J. Dillon

[57] ABSTRACT

An error tolerant detection of multibit synchronization characters within data blocks in a data storage system. Each detected prospective multibit synchronization character is compared to an expected multibit synchronization character for an identical match and for a match which includes a variation of no greater than two adjacent bits. A synchronization character is then considered to be identified in response to a successful exact comparison or, if relaxed detection is enabled, in response to a successful comparison indicating that the detected prospective multibit synchronization character does not differ from the expected multibit synchronization character by an error greater than two adjacent bits. For Read While Write operation in which it is imperative that the synchronization characters be written initially without error, the relaxed detection scheme may be selectively disabled, requiring the synchronization characters to achieve an exact match with the expected synchronization character.

14 Claims, 3 Drawing Sheets

METHOD AND SYSTEM FOR ERROR TOLERANT SYNCHRONIZATION CHARACTER DETECTION IN A DATA STORAGE SYSTEM

BACKGROUND OF THE INVENTION

1. Technical Field

The present invention relates in general to improved data storage systems and in particular to methods and systems for detection of synchronization characters within data stored within a data storage system. Still more particularly, the present invention relates to improved methods and systems for error tolerant detection of synchronization characters within data stored in a data storage system.

2. Description of the Related Art

Modern data processing systems often use digital signal recording devices attached to host processors to record records as addressable units within magnetic tape storage systems.

Examples of systems which may be utilized to record records within a magnetic tape storage system are disclosed within Milligan et al., U.S. Pat. No. 4,393,445; Milligan et al, U.S. Pat. No. 4,435,762; Videki II, U.S. Pat. No. 4,471, 4.57; Cole et al., U.S. Pat. No. 4,603,382; Bauer et al., U.S. Pat. No. 4,423,480; and Fry et al., U.S. Pat. No. 4,403,286. Each of the aforementioned patents discloses a magnetic tape storage system which may be advantageously employed in carrying out the method and system of the present invention.

In such data storage systems, it is practically a necessity that each track of data within the recording medium include multiple synchronization characters. Such bit/byte synchronization characters are necessary so that the data may be considered self-synchronizing. Without such self-synchronizing, data may not be successfully recovered. This self-synchronizing is typically accomplished by inserting various synchronization characters between small blocks or sets of data signals so that the data stored therein may be accurately and efficiently recovered.

A problem which occurs in the detection of such synchronization characters is that data written to storage media often becomes difficult to recover at a later time due to various factors, such as media wear, head wear and errors introduced as a result of interchange of the media between two storage subsystems. Systems which utilize so-called "Block Error Correction" codes and modulation codes to recover bad data rely upon the detection of synchronization character patterns to achieve synchronization. Thus, a failure to detect synchronization characters as a result of even small errors contained therein will cause a loss of synchronization until the occurrence of the next synchronization character, severely degrading the correction capability of Error Correction Code (ECC). Additionally, higher linear track densities also make synchronization character detection sensitive to the channel and often results in an occasional bit error or bit shift error within a synchronization character.

The use of error correction codes within synchronization characters to correct these problems levies an additional requirement that the synchronization character be an ECC code word and satisfy the code constraints, such that the demodulator may initiate properly. In addition, in systems which utilize multiple diverse synchronization characters, this requirement becomes increasingly difficult to implement. Also, synchronization characters which meet this ECC requirement may not be "channel friendly." Another solution, so-called "voting" with regard to the detection of synchronization characters, also may be utilized to increase tolerance for erroneous bits within a synchronization character; however, such systems require a much larger synchronization character which deleteriously affects media capacity.

It should therefore be obvious that a need exists for a method and system which may accurately detect the occurrence of synchronization characters within a data storage system, but which is tolerant of small errors within a synchronization character without requiring additional format overhead or adding additional detection delay.

SUMMARY OF THE INVENTION

It is therefore one object of the present invention to provide an improved data storage system.

It is another object of the present invention to provide an improved method and system for detection of synchronization characters within data within a data storage system.

It is another object of the present invention to provide an improved method and system for error tolerant detection of synchronization characters within data in a data storage system.

The foregoing objects are achieved as is now described. A method and system are disclosed for error tolerant detection of multibit synchronization characters within data blocks in a data storage system. Each detected prospective multibit synchronization character is compared to an expected multibit synchronization character for an identical match and for a match which includes a variation of no greater than two adjacent bits. A synchronization character is then considered to be identified in response to a successful exact comparison or, if relaxed detection is enabled, in response to a successful comparison indicating that the detected prospective multibit synchronization character does not differ from the expected multibit synchronization character by an error greater than two adjacent bits. For Read While Write operations in which it is imperative that the synchronization characters be written initially without error, the relaxed detection scheme may be selectively disabled, requiring the detected synchronization characters to achieve an exact match with the expected synchronization character.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
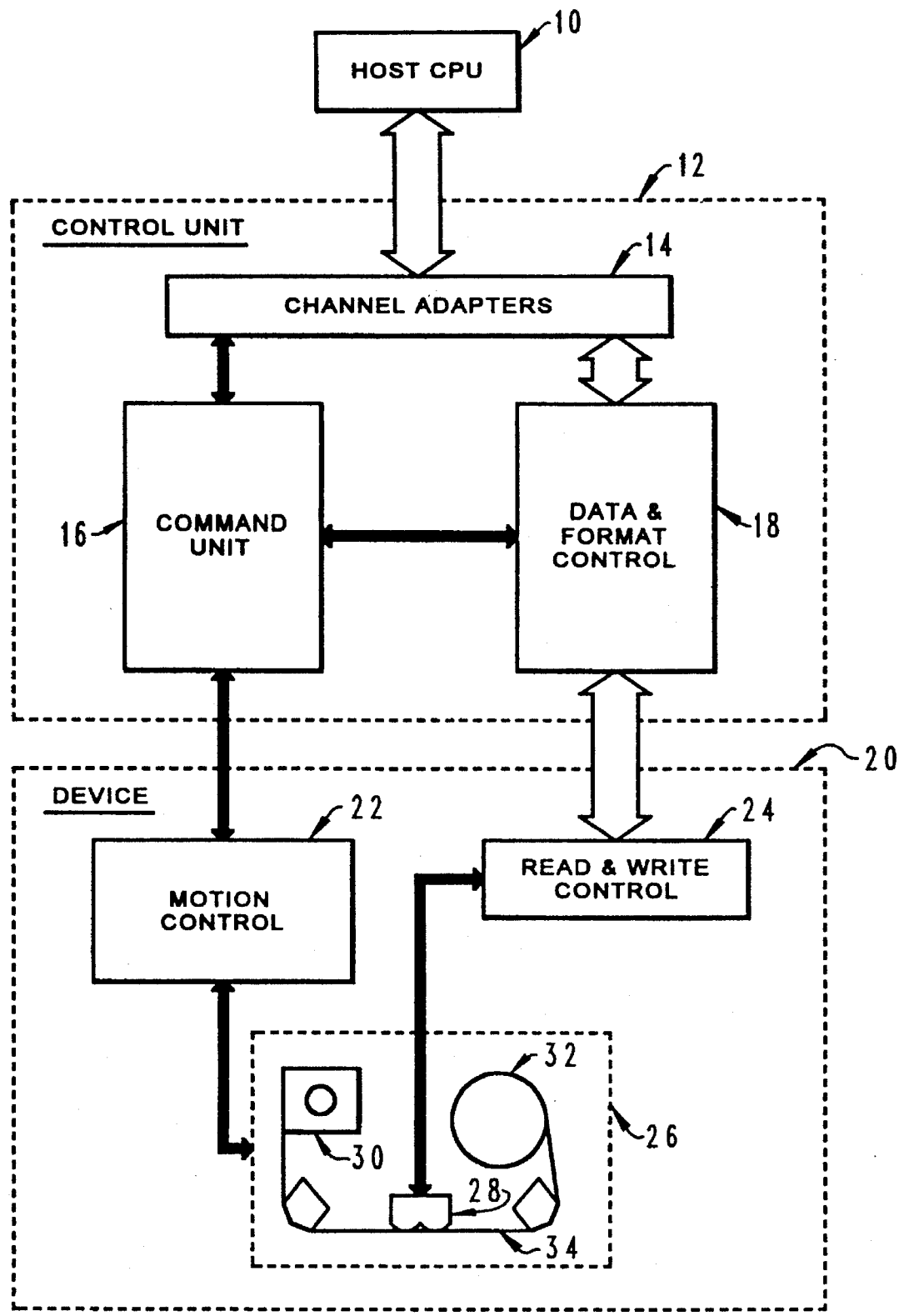
FIG. 1 is a schematic representation of a data storage system which may be utilized with the method and system of the present invention.

With reference now to the figures and in particular with reference to FIG. 1, there is depicted a schematic representation of a data storage system which may be utilized with the method and system of the present invention. As illustrated, a data processing system having a host central processing unit 10 coupled to one or more storage systems. Such storage systems may be implemented utilizing a tape storage system such as the International Business Machines Model No. 3480, 3490, or 3490E Magnetic Tape System. For ease of illustration, a single host CPU and tape storage system are depicted within FIG. 1. As illustrated, host central processing unit 10 is coupled to control unit 12 and at least one magnetic tape recording for playback device 20, and controls such devices accordingly.

As illustrated, control unit 12 includes a command unit 16 which is coupled, via channel adapters 14, to host central processing unit 10, in order to accept commands from host central processing unit 10 to control the mechanical operation of storage device 20. Command unit 16 also preferably controls the flow of data between channel adapters 14 and tape 34, via data and format control 18 and read and write control 24.

As illustrated within FIG. 1, tape storage device 20 preferably includes motion control 22, for controlling the handling of magnetic tape media, and read and write control 24, which includes both read and write circuits for operating on a magnetic transducing head 28 within tape path 26. Tape path 26 preferably includes a tape cartridge 30 having a tape supply reel therein and a tape take-up reel 32. Well known motors and control systems may be utilized for transporting magnetic tape 34 past head 28 for writing data to and reading data from tape 34. The location and prediction of synchronization characters within the data, in accordance with the method and system of the present invention, are accomplished utilizing synchronization character prediction circuitry which is contained within data and format control 18 and which will be explained in greater detail herein.

Figure 2:
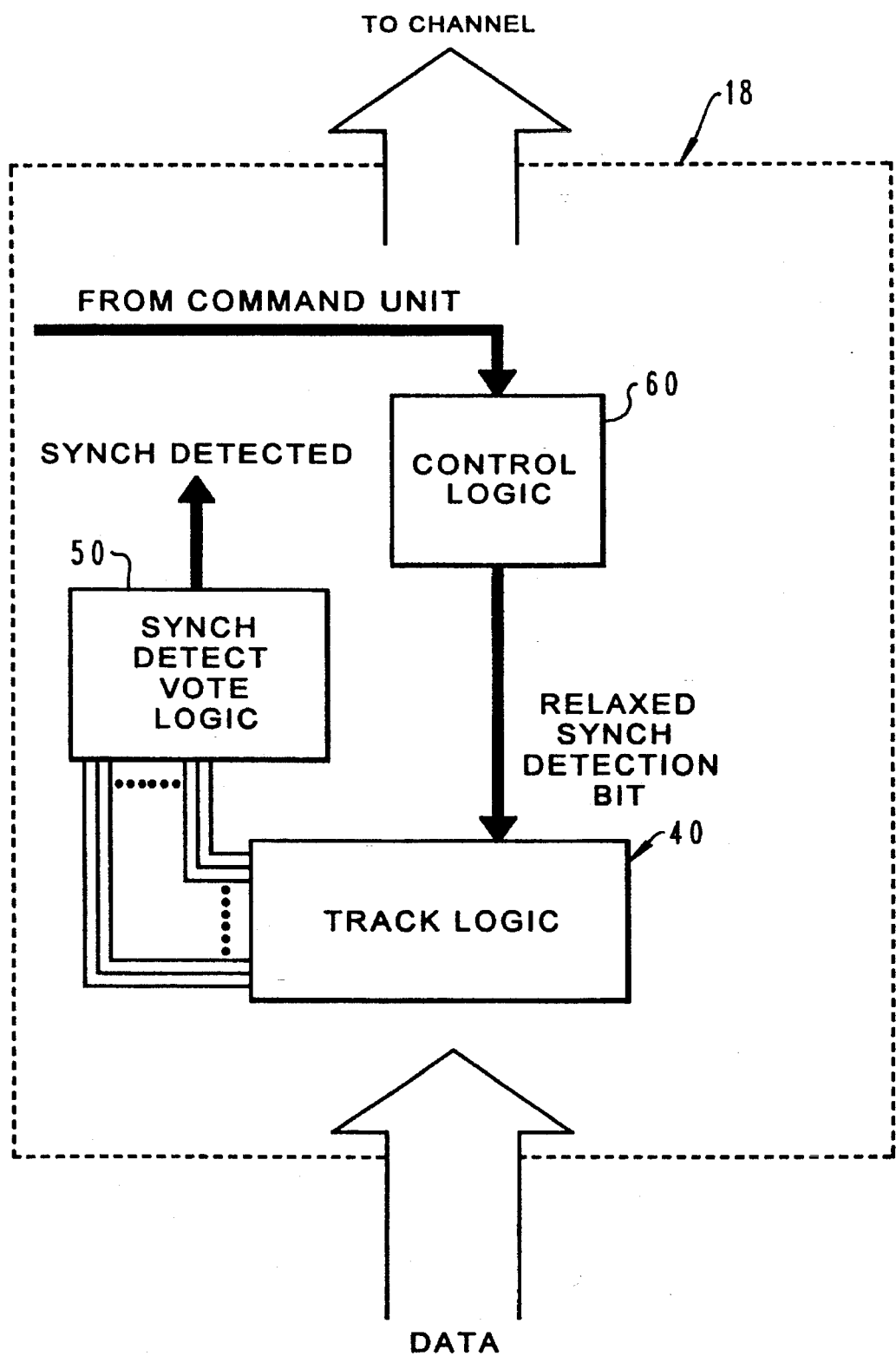
FIG. 2 is a high level block diagram of the data and format control circuitry of the data storage system of FIG. 1.

Referring now to FIG. 2, there is depicted a high level block diagram of the data and format control circuit 18 of the data storage system of FIG. 1. As illustrated, data from head 28 is coupled, via read and write control logic 24, to track logic 40. Track logic 40 is utilized to characterize the data read by head 28 and, although not depicted within FIG. 2, to couple data read from tape 34 to host CPU 10, in a manner well known to those having ordinary skill in the art. The initiation of the retrieval of data from tape 34 is typically preceded by the detection of an acquisition character or acquisition "burst" which is designed to allow individual track clocks to simultaneously acquire bit synchronization for the data on each track. This acquisition character or burst is typically a repeating pattern of bytes which, when modulated and adjusted, produces a unique repeating pattern of bits which is recognized within data and format control circuit 18 as an acquisition character.

In accordance with the method and system of the present invention, the detection of this acquisition character results in a prediction of an expected synchronization character within track logic 40. The identity and type of synchronization character which is expected will, of course, vary with respect to the format in which data is stored within the data storage system; however, those having skill in this art will appreciate that track logic 40 may simply store a predetermined pattern of multiple diverse synchronization characters and attempt thereafter to detect synchronization characters within data read from tape 34 by comparing that data to an expected multibit synchronization character.

As described above, systems which require an exact match between a detected prospective synchronization character and expected synchronization character are often diminished in efficiency as a result of errors which occur within synchronization characters. Thus, in accordance with an important feature of the present invention, track logic 40 is modified in a manner which will be explained in greater detail herein to permit a relaxed synchronization character detection, wherein variations between a detected prospective synchronization character and an expected synchronization character may be tolerated. Applicants have discovered that a single erroneous bit or two adjacent erroneous bits may often occur within a synchronization character and thus, track logic 40 is designed, in accordance with the method and system of the present invention, to indicate the detection of a synchronization character despite the occurrence of such minor errors, when operated in a "relaxed" detection mode, eliminating excess utilization of Error Correction Code (ECC) assets for such minor errors.

The output of track logic 40 indicating a synchronization character has been detected within each track from tape 34 is then coupled to a synchronization character detect vote logic circuit 50. Those having skill in this art will appreciate that such voting circuits are typically utilized to indicate the presence of a synchronization character when a predetermined number of tracks within a multitrack recording system have indicated the occurrence of a synchronization character. Typically, for example, in a sixteen track system an indication of the occurrence of a synchronization character by twelve tracks will result in the assertion that a synchronization character has been detected for the system. Additionally, the failure of the vote logic circuit to indicate the occurrence of a synchronization charater may be utilized to implement a "relaxed" detection mode for use in an Error Recovery Procedure (ERP).

Still referring to FIG. 2, control logic 60 is also illustrated. In manner which will be explained in greater detail herein, a command from command unit 16 (see FIG. 1) may be utilized to either enable or disable the relaxed synchronization character detection feature described above. This is accomplished by creating a relaxed synchronization character detection bit which will be combined with the synchronization character detection circuitry in a manner which will be explained below.

Figure 3:
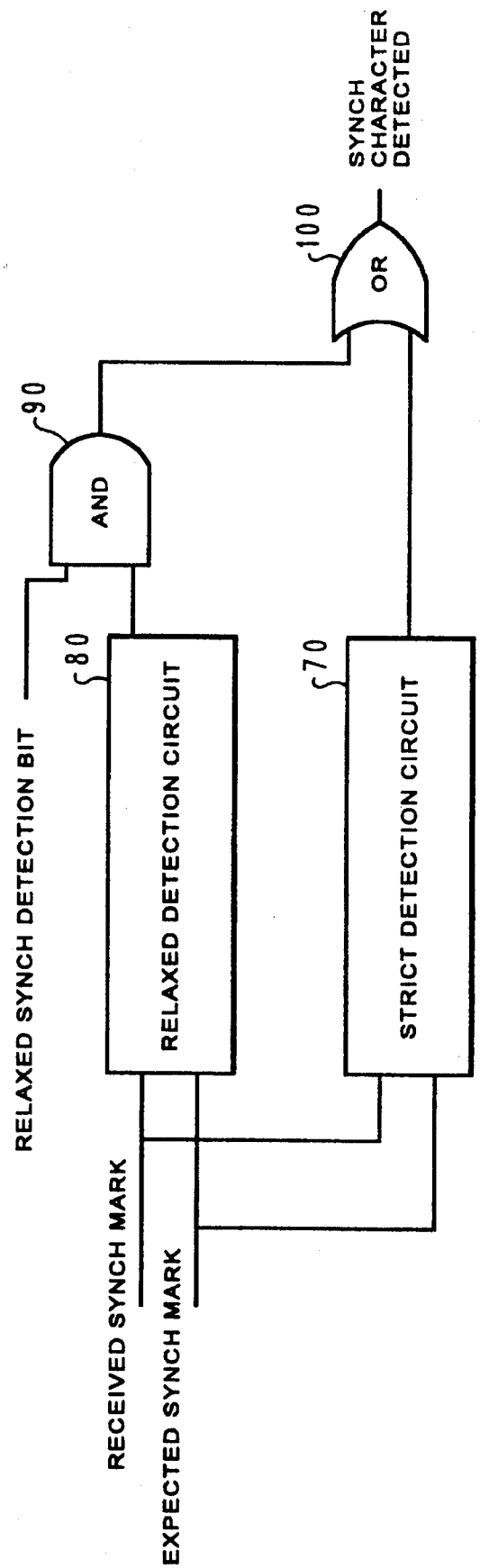
FIG. 3 is a high level block diagram of an error tolerant synchronization character detection circuit which may be utilized within the data storage system of FIG. 1.

Finally, referring to FIG. 3, there is depicted a high level block diagram of an error tolerant synchronization character detection circuit which may be utilized within track logic 40 of FIG. 2 in accordance with the method and system of the present invention. As illustrated, two comparison circuits are provided. Strict detection comparison circuit 70 and relaxed detection comparison circuit 80. Each comparison circuit is coupled to an indication of the expected multibit synchronization character or mark and a received multibit synchronization character or mark in order that a bit by bit comparison between the two characters may be accomplished. Strict detection comparison circuit 70 determines whether or not an exact match has occurred between the expected multibit synchronization character and the received prospective synchronization character. Thus, the output of strict detection comparison circuit 70 will result in a first control signal indicating that the detected synchronization-character is an exact match for the expected synchronization character. That output is coupled to OR gate 100 to be combined with the output of relaxed detection comparison circuit 80 in a manner which will be explained in greater detail herein.

Referring now to relaxed detection comparison circuit 80, the manner in which error toleration is permitted within the synchronization character and detection circuit of the present invention will be illustrated. As above, relaxed detection comparison circuit 80 serves to compare the expected multibit synchronization character with the prospective received synchronization character utilizing an exclusive OR logic function, in a bit by bit fashion. As understood by those having ordinary skill in this art, an exclusive OR outputs a "1" whenever a miscompare occurs and a "0" when a compare occurs. The output of the exclusive OR logic gate contained within relaxed detection comparison circuit 80 is then operated on utilizing a simple logical formula, which implements the circuitry of FIG. 3 and which determines whether or not any error which exists exceeds a single erroneous bit or two adjacent erroneous bits.

Thus, for an example synchronization character which is presumed to include eight bits, equation 1 below is utilized to determine whether or not errors contained within the first three bits are within the described tolerance for a relaxed synchronization character detection.

$$AON=((bit0 \& \overline{bit2} \& \overline{bit3})+(\overline{bit0} \& bit1 \& \overline{bit3})+(\overline{bit0} \& \overline{bit1} \& bit2)) \& SR \quad (1)$$

Equation 1 thus operates on the first three bits of a multibit synchronization character and generally accepts the following conditions. Namely, an error in bit0 while bit1 may also be in error; or, an error in bit1 while bit2 may also be in error; or, an error in bit2 while bit3 may also be in error, where SR implies that relaxed synchronization character detection is enabled.

The next term in the equation which characterizes those errors which will be tolerated in the synchronization character detection circuit of the present invention is set forth in equation 2:

$$ax=\overline{bit0} \& \overline{bit1} \& \overline{bit2} \quad (2)$$

Equation 2 characterizes the situation wherein bit0, bit1 and bit2 are all not in error.

Equation 3, set forth below, operates on the next three bits within the eight bit multibit synchronization character and generally accepts situations in which an error may occur in bit3 while bit4 may also be an error; or, an error may occur in bit4 while bit5 may also be an error; or, an error may occur in bit5 while bit6 may also be in error, where SR implies that relaxed synchronization character detection is enabled.

$$BON=((bit3 \& \overline{bit5} \& \overline{bit6})+(\overline{bit3} \& bit4 \& \overline{bit6})+(\overline{bit3} \& \overline{bit4} \& bit5)) \& SR \quad (3)$$

The fourth portion within the logical equation is set forth as equation 4 below and accepts the conditions where bit3, bin and bit5 are not in error, or if equation 1 is ON, and bit3 is in error, and bits 4 through 6 are not in error. The additional term set forth within equation 4 is directed to the overlap which occurs at bit3.

$$bx=(\overline{bit3} \& \overline{bit4} \& \overline{bit5})+ (AON \& bit3 \& \overline{bit4} \& \overline{bit5} \& \overline{bit6}) \quad (4)$$

The next portion in the logical equation, set forth below as equation 5, operates on the next three bits in the multibit synchronization character and essentially accepts an error in bit6 while bit7 may also be an error; or, an error in bit7 while bit8 may also be an error; or an error in bit8 while bit9 may also be an error. Of course, in an eight bit multibit synchronization character, bit8 and bit9 do not exist, therefore, these bits may be set to zero or the corresponding equation may be eliminated. Again, SR implies that relaxed synchronization character detection is enabled.

$$CON=((bit6 \& \overline{bit8} \& \overline{bit9})+(\overline{bit6} \& bit7 \& \overline{bit9})+(\overline{bit6} \& \overline{bit7} \& bit8)) \& SR \quad (5)$$

Next, equation 6 sets forth the next portion within the error toleration logical equation accepts the condition where bit6, bit7, and bit8 are not in error, or, if equation 3 is ON and bit6 is in error, and bits 7 through 9 are not in error. As above, the additional term handles the overlap which occurs at bit6.

$$cx=(\overline{bit6} \& \overline{bit7} \& \overline{bit8})+ (BON \& bit6 \& \overline{bit7} \& \overline{bit8} \& \overline{bit9}) \quad (6)$$

Finally, each of these portions is combined in logical equation 7 below, in the manner set forth therein. As those skilled in this art will appreciate, this equation sets forth a logical representation of a situation in which the synchronization character may be considered detected if it contains an error in no more than a single bit therein, or in no more than two adjacent bits within the multibit synchronization character.

$$SDET=(AON \& bx \& cx)+(ax \& BON \& cx)+ (ax \& bx \& CON)+ (ax \& bx \& cx) \quad (7)$$

Referring again to FIG. 3, and as set forth in the equations above, the output of relaxed detection comparison circuit 80 is then coupled to AND gate 90 and combined with the relaxed synchronization character detection bit which is generated by control logic 60 (see FIG. 2) in response to a command from command unit 16. This command may be automatically generated as a result of a particular operating mode. For example, during a Read While Write mode the output of relaxed detection comparison circuit 80 may be disabled, requiring strict detection of a synchronization character. Alternatively, during a Read Error Recovery Procedure, relaxed detection may be automatically enabled. Thus, if this bit is not set, only the strict detection comparison will occur. However, setting the relaxed synchronization character detection bit will result in an output from AND gate 90 which will indicate that relaxed detection is enabled and that the prospective detected multibit synchronization character does not contain errors greater than those variations which are permitted, as described above. The output of AND gate 90 is then combined with the output of strict detection comparison circuit 70 as an input to OR gate 100, to provide an indication that a synchronization character has been detected.

Of course, those skilled in the art will appreciate that the relaxed synchronization character detection described within the present application may be utilized continuously while in a Read mode of operation, or may be selectively enabled, in the event strict comparison has not resulted in a detection of a synchronization character. In this manner, data may be recovered, despite a lack of an exact accurate detection of a synchronization character, without requiring the utilization of error correction techniques for synchronization marks, or a voting scheme which requires larger synchronization characters to achieve. As described herein, the circuit delay through the detection logic is generally less than one clock cycle in a twenty megahertz clock system: however, the delay and final gate count required is clearly dependent upon the particular technology utilized. The minimal delay required to implement the error tolerant synchronization character detection system set forth herein is completely compatible with modern high data rate systems.

While the invention has been particularly shown and described with reference to a preferred embodiment, it will be understood by those skilled in the art that various changes in form and detail may be made therein without departing from the spirit and scope of the invention.

We claim:

1. An error tolerant synchronization character detection system for identifying occurrences of synchronization characters in a data storage system having multiple data blocks stored within multiple tracks therein in association with a plurality of multibit synchronization characters, said synchronization character detection system comprising:

track logic means for identifying each expected multibit synchronization character within a data block;

first comparison means within said track logic means for comparing a detected prospective multibit synchronization character with an expected multibit synchronization character and for generating a first output signal in response to an identical match therebetween;

second comparison means within said track logic means for comparing a detected prospective multibit synchronization character with an expected multibit synchronization character and for generating a second output signal in response to a variation between said detected prospective multibit synchronization character and said expected multibit synchronization character of not greater than two adjacent bits; and synchronization character detection means coupled to said first comparison means and said second comparison means for identifying an occurrence of a synchronization character in response to a presence of either said first output signal or said second output signal.

2. The error tolerant synchronization character detection system according to claim 1, further including means for selectively disabling said second output signal.

3. The error tolerant synchronization character detection system according to claim 2, wherein said means for selectively disabling said second output signal comprises a selectable command bit and a logic gate for combining said selectable command bit with said second output signal.

4. The error tolerant synchronization character detection system according to claim 3, wherein said data storage system includes multiple selectable modes of operation wherein said selectable command bit is selected automatically in response to selection of a particular mode of operation of said data storage system.

5. The error tolerant synchronization character detection system according to claim 1, further including a multiple track synchronization detection vote circuit for indicating a detection of a synchronization character in response to an identified occurrence of a synchronization character within a selected number of said multiple tracks.

6. The error tolerant synchronization character detection system according to claim 1, wherein said second comparison means comprises means for exclusive ORing each bit of said detected prospective multibit synchronization character with an expected multibit synchronization character.

7. An error tolerant method for identifying occurrences of synchronization characters in a data storage system having multiple data blocks stored within multiple tracks therein in association with a plurality of multibit synchronization character, said method comprising the steps of:

identifying each expected multibit synchronization character within a data block;

comparing a detected prospective multibit synchronization character with an expected multibit synchronization character and generating a first output signal in response to an identical match therebetween;

comparing a detected prospective multibit synchronization character with an expected multibit synchronization character and generating a second output signal in response to a variation between said detected prospective multibit synchronization character and said expected multibit synchronization character of not greater than two adjacent bits; and identifying an occurrence of a synchronization character in response to a presence of either said first output signal or said second output signal.

8. The error tolerant method for identifying occurrences of synchronization characters according to claim 7, further including the step of selectively disabling said second output signal.

9. A data storage system having multiple data blocks stored therein within multiple tracks on a removable data storage medium, each data block including a plurality of multibit synchronization characters, said data storage system comprising:

a transducing head;

means for moving said removable data storage medium relative to said transducing head;

track logic means for identifying each expected multibit synchronization character within a data block and for detecting a prospective multibit synchronization character, within said data storage medium;

first comparison means within said track logic means for comparing said detected prospective multibit synchronization character with said expected multibit synchronization character and for generating a first output signal in response to an identical match therebetween;

second comparison means within said track logic means for comparing said detected prospective multibit synchronization character with said expected multibit synchronization character and for generating a second output signal in response to a variation between said detected prospective multibit synchronization character and said expected multibit synchronization character of not greater than two adjacent bits; and synchronization character detection means coupled to said first comparison means and said second comparison means for identifying an occurrence of a synchronization character in response to a presence of either said first output signal or said second output signal.

10. The data storage system according to claim 9, further including means for selectively disabling said second output signal.

11. The data storage system according to claim 10, wherein said means for selectively disabling said second output signal comprises a selectable command bit and a logic gate for combining said selectable command bit with said second output signal.

12. The error tolerant synchronization character detection system according to claim 11, wherein said data storage system includes multiple selectable modes of operation wherein said selectable command bit is selected automatically in response to selection of a particular mode of operation of said data storage system.

13. The data storage system according to claim 9, further including a multiple track synchronization detection vote circuit for indicating a detection of a synchronization character in response to an identified occurrence of a synchronization character within a selected number of said multiple tracks.

14. The data storage system according to claim 9, wherein said second comparison means comprises means for exclusive ORing each bit of said detected prospective multibit synchronization character with said expected multibit synchronization character.

* * * * *